US006593558B1

(12) United States Patent
Edgar

(10) Patent No.: US 6,593,558 B1
(45) Date of Patent: Jul. 15, 2003

(54) LUMINANCE-PRIORITY ELECTRONIC COLOR IMAGE SENSOR

(75) Inventor: Albert D. Edgar, Austin, TX (US)

(73) Assignee: Applied Science Fiction, Inc., Austin, TX (US)

(*) Notice: Subject to any disclaimer, the term of this patent is extended or adjusted under 35 U.S.C. 154(b) by 0 days.

(21) Appl. No.: 09/476,164

(22) Filed: Dec. 30, 1999

Related U.S. Application Data

(62) Division of application No. 08/847,688, filed on Apr. 28, 1997, now abandoned.
(60) Provisional application No. 60/017,542, filed on May 10, 1996.

(51) Int. Cl.[7] .................................................. G01J 3/50
(52) U.S. Cl. .................. 250/208.1; 250/226; 250/214.1
(58) Field of Search ............................. 250/208.1, 226, 250/214.1, 214 R; 348/268, 276, 269, 277, 270, 280, 271, 281, 272, 282, 273, 283, 275; 358/512, 513, 514, 518, 500; 430/503, 507, 508, 509, 510, 511, 512; 257/431, 432, 436, 443

(56) References Cited

U.S. PATENT DOCUMENTS

| | | | |
|---|---|---|---|
| 1,956,274 A | | 4/1934 | Comstock .................... 430/503 |
| 4,118,228 A | | 10/1978 | Corluy et al. ............... 430/503 |
| 4,141,036 A | * | 2/1979 | Diehl ........................ 348/277 |
| 4,260,899 A | | 4/1981 | Baker ......................... 250/563 |
| 4,301,469 A | | 11/1981 | Modeen et al. ............... 358/75 |
| 4,302,108 A | | 11/1981 | Timson ....................... 356/359 |
| 4,462,860 A | | 7/1984 | Szmanda ..................... 156/626 |
| 4,469,779 A | | 9/1984 | Suits ......................... 430/363 |
| 4,613,895 A | * | 9/1986 | Burkey et al. ............... 348/272 |
| 4,633,300 A | * | 12/1986 | Sakai ........................ 348/223 |
| 4,651,001 A | * | 3/1987 | Harada et al. ............... 250/330 |
| 4,670,779 A | | 6/1987 | Nagano ....................... 358/75 |
| 4,677,289 A | * | 6/1987 | Nozaki et al. ............... 250/226 |
| 4,677,465 A | | 6/1987 | Alkofer ....................... 358/80 |
| 4,680,638 A | | 7/1987 | Childs ........................ 358/214 |

(List continued on next page.)

FOREIGN PATENT DOCUMENTS

| | | | |
|---|---|---|---|
| DE | 28 21 868 A1 | 11/1979 | ........... G01N/21/32 |
| DE | 196 36 867 C1 | 1/1998 | ............ H04N/5/21 |
| EP | 1 547 811 | 6/1979 | ............ H04N/3/36 |

(List continued on next page.)

OTHER PUBLICATIONS

*New Adaptive Vector Filter Based on Noise Estimate*, Mei Yu, et al., IEICE Trans Fundamentals, vol. E82, No. 6, Jun., 1999.

(List continued on next page.)

Primary Examiner—Stephone B. Allen
(74) Attorney, Agent, or Firm—Dinsmore & Shohl LLP

(57) ABSTRACT

In luminance priority multilayer color film, one of the layers substantially matches the luminance sensitivity of the human eye. This luminance layer distinguishes from prior art color films that have a blue, a green, and a red sensitive layer. This luminance layer has the priority front position to sense light before being diffused and attenuated by other layers, giving the luminance record enhanced speed and clarity compared to prior art blue-priority color film. In another embodiment, a layered CCD sensor has a top silicon layer that is sensitive to all colors, followed by a yellow filter, a second silicon layer responsive to green and red light only because of the yellow filter, a cyan filter, and a bottom silicon layer receiving only green light. An image from a luminance-priority color sensor inputs to a color space conversion to recover full color. In the preferred embodiment, a luminance layer on top maps to a luminance "Y" value, and underlying color sensitive layers are used in conjunction with the luminance to derive the "U" and "V" chrominance vectors of YUV color space.

20 Claims, 7 Drawing Sheets

U.S. PATENT DOCUMENTS

| | | | |
|---|---|---|---|
| 4,700,229 A | 10/1987 | Herrmann et al. | 358/166 |
| 4,764,670 A | 8/1988 | Pace et al. | 250/226 |
| 4,775,238 A | 10/1988 | Weber | 356/431 |
| 4,796,061 A | 1/1989 | Ikeda et al. | 355/73 |
| 4,830,954 A | 5/1989 | Matejec | 430/505 |
| 4,845,551 A | 7/1989 | Matsumoto | 358/80 |
| 4,933,566 A | 6/1990 | Masaaki et al. | 250/563 |
| 4,937,720 A | 6/1990 | Kirchberg | 363/41 |
| 4,969,045 A | 11/1990 | Haruki et al. | 358/228 |
| 4,972,091 A | 11/1990 | Cielo et al. | 250/562 |
| 4,989,973 A | 2/1991 | Noso et al. | 356/239 |
| 4,994,918 A | 2/1991 | Lingemann | 358/214 |
| 5,003,379 A | 3/1991 | Moore, Jr. et al. | 358/54 |
| 5,010,401 A | 4/1991 | Murakami et al. | 358/136 |
| 5,018,006 A * | 5/1991 | Hashimoto | 348/275 |
| 5,047,968 A | 9/1991 | Carrington et al. | 364/574 |
| 5,055,921 A * | 10/1991 | Usui | 358/512 |
| 5,058,982 A | 10/1991 | Katzir | 385/33 |
| 5,091,972 A | 2/1992 | Kwon et al. | 382/54 |
| 5,097,521 A | 3/1992 | Massmann | 382/54 |
| 5,119,181 A * | 6/1992 | Perregaux et al. | 348/275 |
| 5,149,182 A | 9/1992 | Keller | 356/405 |
| 5,149,960 A | 9/1992 | Dunne et al. | 250/226 |
| 5,155,596 A | 10/1992 | Kurtz et al. | 358/214 |
| 5,200,817 A * | 4/1993 | Birnbaum | 358/518 |
| 5,266,805 A | 11/1993 | Edgar | 250/330 |
| 5,267,030 A | 11/1993 | Giorgianni et al. | 358/527 |
| 5,291,286 A | 3/1994 | Murakami et al. | 348/469 |
| 5,298,771 A | 3/1994 | Mantell | 257/183.1 |
| 5,311,310 A | 5/1994 | Jozawa et al. | 348/416 |
| 5,335,086 A | 8/1994 | Kitamura | 358/431 |
| 5,371,542 A | 12/1994 | Pauli et al. | 348/262 |
| 5,447,811 A | 9/1995 | Buhr et al. | 430/20 |
| 5,448,380 A | 9/1995 | Park | 358/520 |
| 5,452,018 A | 9/1995 | Capitant et al. | 348/651 |
| 5,465,155 A | 11/1995 | Edgar | 385/500 |
| 5,465,163 A | 11/1995 | Yoshihara et al. | 358/444 |
| 5,477,345 A * | 12/1995 | Tse | 358/500 |
| 5,509,086 A | 4/1996 | Edgar et al. | 382/167 |
| 5,516,608 A | 5/1996 | Hobbs et al. | 430/30 |
| 5,552,904 A | 9/1996 | Ryoo et al. | 358/518 |
| 5,561,611 A | 10/1996 | Avinash | 364/553 |
| 5,565,931 A | 10/1996 | Girod | 348/675 |
| 5,568,270 A | 10/1996 | Endo | 358/298 |
| 5,581,376 A | 12/1996 | Harrington | 358/518 |
| 5,582,961 A | 12/1996 | Giorgianni et al. | 430/508 |
| 5,583,950 A | 12/1996 | Prokoski | 382/212 |
| 5,589,887 A | 12/1996 | Wischermann | 348/616 |
| 5,608,547 A | 3/1997 | Nakatani et al. | 358/505 |
| 5,641,596 A | 6/1997 | Gray et al. | 430/21 |
| 5,666,443 A | 9/1997 | Kumashiro | 382/266 |
| 5,673,336 A | 9/1997 | Edgar et al. | 382/167 |
| 5,721,624 A | 2/1998 | Kumashiro et al. | 358/450 |
| 5,726,773 A | 3/1998 | Mehlo et al. | 358/474 |
| 5,729,631 A | 3/1998 | Wober et al. | 382/232 |
| 5,771,107 A | 6/1998 | Fujimoto et al. | 358/464 |
| 5,808,674 A * | 9/1998 | Adams, Jr. et al. | 348/273 |
| 5,892,595 A | 4/1999 | Yamakawa et al. | 358/530 |
| 5,923,042 A | 7/1999 | Mietta et al. | 250/559.06 |
| 5,930,388 A | 7/1999 | Murakami et al. | 382/167 |
| 5,963,662 A | 10/1999 | Vachtsevanos et al. | 382/150 |
| 5,965,875 A * | 10/1999 | Merrill | 250/226 |
| 5,969,372 A | 10/1999 | Stavely et al. | 250/559.42 |
| 5,979,011 A | 11/1999 | Miyawaki et al. | 15/308 |
| 5,982,941 A | 11/1999 | Loveridge et al. | 382/260 |
| 5,982,951 A | 11/1999 | Katayama et al. | 382/284 |
| 5,991,444 A | 11/1999 | Burt et al. | 382/284 |
| 6,005,987 A | 12/1999 | Nakamura et al. | 382/294 |
| 6,057,040 A | 5/2000 | Hage | 428/447 |
| 6,075,905 A | 6/2000 | Herman et al. | 382/284 |
| 6,078,051 A | 6/2000 | Banton et al. | 250/341.1 |
| 6,078,701 A | 6/2000 | Hsu et al. | 382/294 |
| 6,101,273 A | 8/2000 | Matama | 382/169 |
| 6,128,416 A | 10/2000 | Oura | 382/284 |
| 6,239,886 B1 * | 5/2001 | Klassen et al. | 358/518 |

FOREIGN PATENT DOCUMENTS

| | | | |
|---|---|---|---|
| EP | 0 422 220 A1 | 4/1991 | A61B/6/03 |
| EP | 0 482 790 B1 | 4/1992 | H04N/1/40 |
| EP | 0 527 097 A2 | 2/1993 | H04N/1/40 |
| EP | 0 569 142 A1 | 11/1993 | H04N/5/253 |
| EP | 0 624 848 A2 | 11/1994 | G06F/15/68 |
| EP | 0 699 753 A2 | 8/1995 | H04N/1/407 |
| EP | 0 716 538 A2 | 6/1996 | H04N/1/50 |
| EP | 0 751 670 A2 | 1/1997 | H04N/1/10 |
| EP | 0 768 621 A2 | 4/1997 | G06T/5/20 |
| EP | 0 794 454 A2 | 9/1997 | G03B/27/73 |
| EP | 0 816 833 A2 | 1/1998 | G01N/21/88 |
| EP | 0 816 833 A3 | 8/1998 | G01N/21/88 |
| EP | 0 893 914 A2 | 1/1999 | H04N/5/253 |
| GB | 2 283 633 A | 5/1995 | H04N/5/262 |
| JP | 4-291139 | 10/1992 | G01N/21/89 |
| JP | 11185028 | 7/1999 | G06T/1/00 |
| JP | 2000-13604 | 1/2000 | H04N/1/409 |
| JP | 2000-196813 A | 7/2000 | |
| WO | WO 84/02019 | 5/1984 | G06F/15/20 |
| WO | WO 89/06890 | 7/1989 | H04N/3/36 |
| WO | WO 90/01240 | 2/1990 | H04N/1/40 |
| WO | WO 91/09493 | 6/1991 | H04N/5/127 |
| WO | WO 92/05469 | 4/1992 | G03B/27/53 |
| WO | WO 95/15530 | 6/1995 | G06F/17/14 |
| WO | WO 97/16028 | 5/1997 | H04N/7/30 |
| WO | 97/43613 | 11/1997 | G01J/3/50 |
| WO | WO 98/31142 | 7/1998 | H04N/5/253 |
| WO | WO 98/34397 | 8/1998 | |
| WO | WO 99/40729 | 8/1999 | H04N/9/11 |
| WO | WO 01/48694 | 7/2001 | G06T/5/00 |

OTHER PUBLICATIONS

*A Robust Method for Parameter Estimation of Signal–Dependent Noise Models in Digital Images*, B. Aiazzi, et al., IEEE, 1997, pp. DSP 97—601–604.

*A Regularized Iterative Image Restoration Algorithm*, Aggelos K. Katsaggelos, et al., IEEE, 1991, pp. 914–929.

*Adaptive Fourier Threshold Filtering: A Method to Reduce Noise and Incoherent Artifacts in High Resolution Cardiac Images*, M. Doyle, et al., 8306 Magnetic Resonance in Medicine, May, 31, 1994, No. 5, Baltimore, MD., pp. 546–550.

*Anisotropic Spectral Magnitude Estimation Filters for Noise Reduction and Image Enhancement*, Til Aach, et al., IEEE, 1996, pp. 335–338.

*Adaptive–neighborhood filtering of images corrupted by signal–dependent noise*, Rangaraj M. Rangayyan et al., Applied Optics, vol. 37, No. 20, Jul. 10, 1998, pp. 4477–4487.

*Digital Imaging Equipment White Papers*, Putting damaged Film on Ice, A Technical Discussion of Advances in Digital Imaging, Nikon Corporation, http://www.nikonusa.com/reference/whitepapers/imaging/ditechdisc.html, Aug. 5, 1999.

*Local Cosine Transform—A Method for the Reduction of the Blocking Effect in JPEG*, Gil Aharoni, et al., Journal of Mathematical Imaging and Vision, 3, 7–38, 1993.

*Digital ICE*, Applied Science Fiction, Inc., http://www.asf-.com/html/o_products/iceprod.html. Aug. 5, 1999.

*About Digital ISE Technology*, Applied Science Fiction, Inc., http://www.asf.com/html/o_products/icetech.html. Aug. 5, 1999.

*2–D Adaptive Volterra Filter for 2–D Nonlinear Channel Equalisation and Image Restoration*, J.N. Lin, et al., Electronic Letters, vol. 28, No. 2, Jan. 16, 1992, pp. 180–182.

\* cited by examiner

LUMINANCE-PRIORITY ELECTRONIC COLOR IMAGE SENSOR

This is a division of application Ser. No. 08/847,688, now abandoned filed Apr. 28, 1997 which claims priority to U.S patent application Ser. No. 60/017,542, filed May 10, 1996.

BACKGROUND

Full color film must sense in three color dimensions. These three dimensions are sensed by three monochrome, or black and white emulsions, each acting as a sensor for a different spectral sensitivity, or color. In digital imaging terminology, each of these emulsions produces a separate color channel, or component of the full color image. Historically, there have been several topological arrangements of these sensors. The first color film, Duffycolor, used colored rice grains to create a red, green, and blue matrix over black and white film like a modern CCD matrix. Polaroid made an instant transparency film that lay red, green, and blue stripes over a black and white film, similar to the shadowmask in a color CRT. The original Technicolor process exposed three spatially separate color images on black and white film, created a separate dye transfer matrix from each, and dyed a single layer of receiving film with three dyes from the three matrices to make the theatrical print. It wasn't until the advent of Eastman's multilayer Kodachrome that a color film suitable for the mass market became practical.

Today virtually all color film includes multiple layers stacked on top of each other Light impinging on the film passes through all the layers. The layers have different spectral sensitivities, so depending on the color of the light, it will expose a specific layer. In most films, each layer also is given at manufacture a unique color coupler, or piece of a dye molecule, that will react with byproducts of development to form a full dye appropriate to the color sensitivity of that layer. After development, the silver image is bleached away, leaving a color image composed of dyes in layers. If you abrade a color film, black areas will first turn blue as the yellow layer is removed, then cyan, as the magenta layer is removed, and finally white as all layers are removed.

Kodachrome has multiple layers, but uses a unique process limited to reversal transparency film that does not require couplers to be stored in the undeveloped film. After a first development to expend to silver the exposed silver halide, the unexposed halide is flash exposed and processed in a developer containing its own color coupler. In Kodachrome the flash exposure is done one color at a time to flash one color layer at a time, followed after each flash by a developer with a coupler specific to the color sensitivity of that layer. Kodachrome development is very difficult, and only a few labs in the world process Kodachrome. However, by eliminating color couplers from the film during exposure, light scattering in the emulsion is reduced, giving Kodachrome an extra measure of clarity. Negative film gives a much wider latitude than reversal film, but in the prior art the Kodachrome process was limited to reversal film, and there was no way to obtain the latitude advantage of a negative film and at the same time the sharpness advantage of a film without couplers.

Prior art color film was limited to operate in the RGB color space because each layer had to map to a specific dye that would develop an image, or color channel, that could be viewed or printed directly without color space conversion. Thus, a red sensitive layer was needed to generate cyan dye to modulate the amount of red light passing through the developed film, a green sensitive layer generated magenta dye, and a blue sensitive layer generated yellow dye. This traditional requirement of direct viewability of the chemically developed image placed a restriction on prior art color film to sense light in the RGB color space. Furthermore for pure colors to be recorded and viewed without color space conversion, the layers had to sense relatively pure red, green, and blue, without cross, contamination of colors. For example, if the magenta forming layer sensed blue light in addition to green, and the red sensitive layer sensed blue in addition to red, then a blue flower would expose not only the blue layer, but also the green and red, forming a shade of gray when developed conventionally and viewed directly as a color image.

Further, the depth ordering of sensitive layers of conventional color film was limited by the universal sensitivity of silver halide to blue light. Silver halide always is blue sensitive. In addition to this blue sensitivity, dyes may be added to trap the photons of other colors and couple them into the halide crystals. Thus a green sensitive layer is actually sensitive to both blue and green, and a red sensitive layer is sensitive to both blue and red. Green only and red only sensitive layers, which are needed for direct control of the magenta and cyan dyes, can only be realized by filtering out blue light with a yellow filter. In color film this is accomplished by adding a yellow filtering layer. This yellow layer must of course, be placed above the red and green sensitive layers in order to filter blue light from those layers, and must be under the blue sensitive layer so as not to occlude blue light from that blue sensing layer. Thus in the prior art, the blue sensitive layer had to be on top, over the yellow filter and therefore over the red and green sensitive layers.

Undeveloped silver halide scatters light with its milky consistency. When held up to the light, undeveloped film acts as a diffuser and attenuator. This can be observed while loading film into a camera. Each sensitive layer in color film degrades the image for lower layers, both by diffusing and thus blurring the light, and also by using, reflecting, and absorbing some of the light, thus dimming the light to lower layers, and requiring those layers to be more sensitive, and hence grainier. Only the top layer receives the full unattenuated, unblurred light.

Because the human eye senses detail almost totally in the luminance, ideally the full luminance should be sensed in that top layer. Unfortunately only one layer can be on top. The next choice would be to make that one layer the green sensor because green is responsible for over half the luminance. But as we have just shown, the blue layer must be on top, followed by a yellow filtering layer prior to the green. Blue is responsible for only about 10% of luminance, therefore the mandatory requirement that blue be on top means that almost all the luminance is sensed at lower layers where the image is dimmed and blurred. Most of the advancement in film technologies has been in color film, and yet today a fine-art black and white print has a clarity and vivaciousness that is not matched by prior art color film.

There have been historic and niche attempts to place green or red on top. Most interesting is color print paper which places blue at the bottom and red on top. The immediate question is how the red sensing layer is shielded from blue. Actually it isn't shielded, and in fact the red sensing layer is nearly as sensitive to blue light as to red. Several conditions unique to printing paper make this practical. First, because the high contrast paper views a low contrast negative, the density range of exposure needed to go from white to black is only about 10:1, as opposed to camera film that must respond over a 1000:1 range, and a separation of 100:1 between red and blue is therefore adequate for print paper. Printing paper sees light that typically emanates from an orangish incandescent light, filtered by an orangish filter pack that removes typically 80% of the blue from the lamp, and is then focused through a negative that has the base orange cast of the coupler mask. The deep orange of the resulting light takes the place of the yellow filter level in camera film for the low contrast image of negative printing, and the blue sensitive layer is made about 100 times more sensitive than the red layer to compensate for the orange light, which is possible because of the relatively low base sensitivity of printing paper compared to camera film.

The approach used in printing paper to put the red on top would not work with camera film because, first, the film must respond over a range of 1000:1, not 10:1, second, the light coming through the lens is not deep orange, and third, even if it was, to match an ASA 400 red sensitivity, a blue layer 100 times more sensitive would need to be ASA 40,000, which would be very grainy. Nevertheless there have been attempts to place the green layer on top. Despite the improvements mentioned earlier, the unavoidable color muting caused by crosscolor contaminations caused these attempts to fail to be accepted by the market.

Although prior art color film senses with Red-Green-Blue channels, directly capturing three dimensional RGB color space, in image processing and storage other color spaces are possible that better exploit the needs of human vision. A common color space includes luminance and chrominance. Typically the luminance value is a blend of red, green, and blue in proportion to the sensitivity of the human eye, called by convention "Y". The chrominance requires two values, which, with the "Y" value, define the three dimensions of color. A common representation of chrominance includes "U", which is luminance minus red, and "V", which is luminance minus blue. "U" and "V" are thus color tints layered on the monochrome "Y" record. The human eye is much more sensitive to detail in the "Y" channel, and thus "U" and "V" can tolerate less detail and more grain.

Color space conversion is a related art. Color space conversion maps an input suite of color channels into an output suite in a different color space or with different image colors. In a normal 3 dimensional color space conversion algorithm, three measurements at each image pixel, corresponding to the values at each pixel in each of the three sensed color channels, pass into the algorithm. That algorithm mathematically maps through a function to provide three measurements, or colors corresponding to that image pixel, out of the algorithm. For example, in digital development with prior art conventional color, film, as will be explained in more detail below, the "front" and "back" images containing blue and red are subtracted from the "through" image containing red, green, and blue, to yield just the green. A small portion of this green image is subtracted from the "front" image to yield the blue image, and the "back" image is mapped directly to red. In this color space conversion, for each pixel front, back, and through measurements from the front, back, and through channels pass in and red, green, and blue pass out. Color space conversion can be employed with any suite of channels to map from one set of colors to another, for example, to map grays to blues. Although some color space conversions can be defined by equations, in the general case a lookup table can be employed to give any arbitrary conversion.

A further related technology is direct digital development of images. This is a method of digitizing color film during development. The developing negative is scanned using infrared so as not to fog the developing film. Color is derived from a silver image during development by taking advantage of the milkish opacity of unfixed silver halide to separate the 3 layers optically. Viewed from the top during development, the top layer is seen clearly, while the lower layers are substantially occluded by the milkish opacity of the top layer. Viewed from the rear during development, the back layer is seen, while the other layers are mostly occluded. Finally viewed by transmitted light, the fraction of light that does penetrate all three layers is modulated by all, and so contains all 3. If the exposures of front, back, and through were mapped directly to yellow, cyan, and magenta dyes, a pastelized color image would result. However in digital development these three scans, front, back, and through, are processed digitally using color space conversion as explained above to recover full color.

The invention can also be practiced with layered sensors other than silver halide. A specific embodiment will be given for solid state sensing elements. Virtually all electronic imaging today uses silicon solid state sensors. When a photon strikes a silicon semiconductor, the photon knocks an electron from an atom, producing a hole-electron pair that allows a unit of charge to flow. Usually this charge is transferred to a small capacitor representing one picture element, or pixel, and this held charge is shifted in sequence with the charge from other pixels in a CCD, or Charge Coupled Device shift register, into an amplifier. Thus a "CCD" is a specific arrangement commonly used to read information from an array of solid state sensing elements.

A silicon solid state sensing element itself is sensitive to all visible colors. A full color image may be sensed by splitting light into three colored images with dichroic mirrors, and sensing each image with spatially separate sensing arrays. Such 3 chip cameras are very expensive and bulky, are generally not sensitive in low light because of light loss, and require expensive optics to project a virtual image of the lens aperture deep through the prisms.

An alternate and more common approach to color attenuates light with colored filters, exposing each individual sensing element to light from which at least one color has been removed. Some cameras designed for still photography use red, green, and blue filters laid in a matrix, such as the Bayer matrix used by Kodak cameras that place green over half the sensors in a square matrix to create a green checkerboard interlaced with a quarter of the pixels under red filters and a quarter under blue filters. Some cameras designed for video employ cyan, magenta, yellow, and green filters laid in matrix allowing easy conversion to YUV as the signal is read sequentially from the chip. Other colors and arrangements are used also. All such single chip cameras suffer from several problems. First, light removed by the filters is lost to the sensors. A particular single chip camera is rated ASA 100 with the colored filters in place. With the filters removed in a black and white version of the same camera, the rated speed jumps 4 times to ASA 400. Second, the colored matrix itself interacts with image detail to create colored moire artifacts common in single chip digital cameras. Typical manifestations of these moire artifacts include one red eye and one blue eye, or a distant building with randomly red and blue windows. Third, the color matrix reduces the effective resolution of the sensor array, and attempts to reduce colored moire artifacts by blurring with an optical antialiasing filter reduce the effective resolution.

The prior art has always believed that full color required sensors to operate in complementary color groups. The groups could include red, green; and blue, or cyan, green, magenta and yellow, but at least one color needed to be removed from each color sensor to complement some other sensor. This belief precluded the layering of a solid state sensor in which color response was incorporated with subtractive interlayer filters rather than variations in the color sensitivity of the layers themselves as in film, because it would have been impossible to remove any color for the top layer and still have it reappear for sensing at a lower layer.

SUMMARY OF INVENTION

A color image sensor responsive to light from an exposing light source which includes a first sensitive layer with a first spectral sensitivity. The color image sensor also includes at least one second sensitive layer with a second spectral sensitivity different from the first spectral sensitivity. The second spectral sensitivity is offset from the first sensitive layer in a direction perpendicular to the plane of the first sensitive layer. The first spectral sensitivity substantially matches the spectral sensitivity of the human eye.

DESCRIPTION OF THE INVENTION

Figure 1:
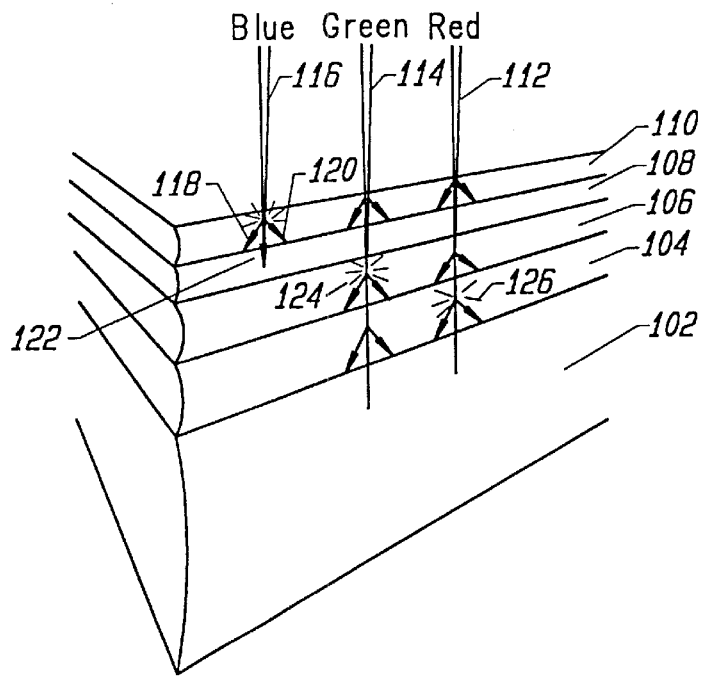
FIG. 1 illustrates the structure of typical prior art color film.

Referring now to FIG. 1, the construction of prior-art color film is described. Construction begins with a structural base 102. Sensitive layers containing a silver halide emulsion are placed in thin films over this base. These layers contain silver halide with a native sensitivity to blue light. In addition, some of these layers have added to them a sensitizing dye to extend the sensitivity to other colors. First, a red and blue sensitive layer 104 is laid in a thin film over the base 102. A green and blue sensitive layer 106 is placed over this. Then a yellow filter layer 108 is placed to absorb blue light. Finally a blue sensitive layer 110 is placed on the top. Other layers not relevant to this discussion are omitted for clarity; for example, a layer on the opposite side of the base 102 sometimes is added to reduce halation and allow retouching, an overcoat protects all the layers, and furthermore each color sensitive layer is typically subdivided into three sublayers of different sensitivities. The details of the construction of color film are commonly known in the art of color film manufacture, and may be found in references such as Michael Freeman, Film Making the Most of Films and Filters, Amphoto, 1988, and W. F. Berg, editor, Photographic Science: symposium: Zurick 1961, The Focal Press, London, 1963. Light consisting of a red light ray 112, a green light ray 114, and a blue light ray 116, impinges on the film. First in order from the direction of the light the blue sensitive layer 110 intercepts blue photons to generate a silver latent image in the halide crystals of that layer at point 118. In addition, light of all colors is absorbed and scattered about equally by the blue sensitive layer 110, which appears grayish and opalescent to light. This absorption is illustrated by a thinning of light rays 112, 114, and 116, and by scattered rays 120. The blue sensitive layer 110 is typically made thinner than the other layers to lessen the absorption and scattering at the expense or a grainier blue channel.

Next in order from the direction of the light the yellow filter layer 108 excludes the blue light ray 116 from reaching lower layers by absorbing it at point 122. Before reaching layers under the yellow filter, the green light ray 114 has been attenuated and scattered by the blue sensitive layer 110. The green sensitive layer 106 intercepts the remaining green photons to generate a silver latent image at point 124. Finally, after having been diffused and attenuated by several layers, the red sensitive layer 104 intercepts some remaining red photons to generate a silver latent image at point 126.

Figure 2:
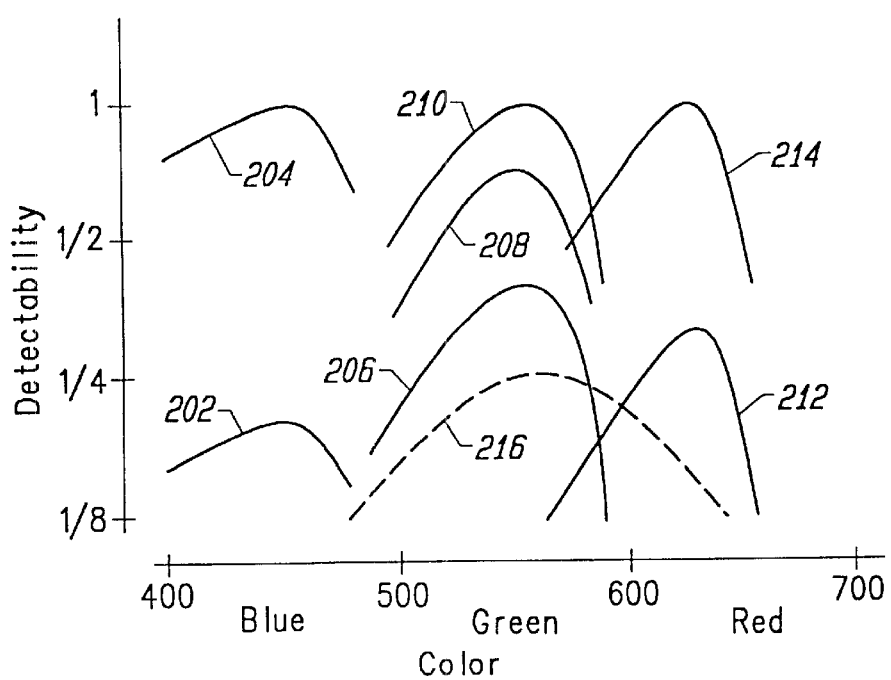
FIG. 2 graphs the quantum detectabilities of prior art color film.

FIG. 2 illustrates the spectral response of the sensitive layers 104, 106, and 110 of FIG. 1. The horizontal axis is wavelength in nanometers. The vertical axis is in arbitrary units of quantum detectability, not sensitivity or speed. Quantum detectability is used here to mean the sensitivity to low contrast detail relative to an ideal photon counter. Quantum detectability is raised by sensing a higher percentage of photons (quantum efficiency), counting each with more equality (count nonuniformity), minimizing nonphoton noise sources or grain (dark count, pixel nonuniformity), and reducing scattering (finer spatial distinction between an event, such as a star image, and the background). High speed and low speed films have roughly equal quantum detectability. A higher speed film utilizes larger crystals to gather light from a larger area. Although it may take less light to "expose" a high speed film, the larger grains give more noise to measurements and scatter light over a wider area so the ability to detect a detail, such as the presence of a well focused star image, is no better with a high speed film than with a slow film that would retain the star image in a smaller area and measure its presence with less grain, or uncertainty.

It is interesting how the thickness of a layer affects quantum detectability. Assume for a moment that the silver halide is totally transparent to light. Now a thick layer that is twice as thick as another thin layer may be modeled mathematically as two thin layers together. Each thin layer has a particular signal gain (contrast) and noise (grain). By adding the signals (channels) of the two thin layers together, one gets twice the signal, but the noise adds statistically to give square root of two more noise, hence the signal to noise ratio of a thick layer is square root of two better than a thin layer of half the thickness. If an ideal photon counter received twice the number of photons, the signal to noise ratio would improve by square foot of two, again from statistics theory. Therefore the quantum detectability of the thick layer is twice that of the thin layer of half the thickness. This makes perfect sense because the thick layer would intercept just twice as many of the passing photons as the thin layer of half the thickness. This has assumed that silver halide is completely transparent to light. In fact silver halide absorbs some light, and hence lower portions of the film receive less light, and there is diminishing returns until finally the extra grain of a bottom layer would more than offset any gains in signal. Based on this, the designed thickness of film is an optimization problem in which too thin an emulsion lets valuable photons escape, and too thick an emulsion adds grain from lower layers that would receive very few photons. The optimization problem is particularly important with multilayer color film because any layer can be given priority over another layer by controlling both thickness and ordering of the layers.

Continuing now with FIG. 2, curve 202 illustrates the quantum detectability of the blue layer 110. It is seen to be quite low, as blue is often sacrificed with a thin layer in an attempt to reduce scattering and attenuation of light. Curve 204 illustrates what the blue quantum detectability could have been if the blue layer were optimized in thickness for itself. Of course if this were done, the green and red layers would suffer with very low quantum detectability.

Curve 206 illustrates the quantum detectability of the green sensitive layer 106. Curve 208 illustrates what the quantum detectability would have been if the blue sensitive layer had not attenuated and scattered green light. This loss is significant because green is the primary contributor to luminance, and hence detail as perceived by the human eye. Curve 210 illustrates what the green detectability could have been if in addition the green layer were optimized in thickness for itself. There would not be a big improvement because green is usually given priority in light interception because it is the major contributor to luminance.

Curve 212 illustrates the quantum detectability of the red sensitive layer 104. Curve 214 illustrates what the quantum detectability would have been if the previous layers had not attenuated and scattered red light. The difference between curves 212 and 214 is large because the thick green layer, along with the blue layer; has removed and scattered much of the red light. Because the red sensitive layer is at the bottom, it is already optimized in thickness for itself to make maximum use of whatever unscattered red photons reach the bottom layer.

Finally curve 216 illustrates the overall sensitivity to luminance, which is a mix of about 50% of the green layer, 35% of the red layer, and 15% of the blue layer. The ratios vary with the dyes, and are different than the luminance values commonly known for television phosphors. The detectability is lower than anyone layer by itself for an interesting reason. If the green layer had also been made sensitive to blue light by removing the yellow filter, then under green light one would see the response of the green-blue layer and the grain or the green-blue layer. However the green-blue layer has filtered from it blue light. The blue response needed for luminance is added back in by adding in the response of a blue layer. Now to green light one sees the same response of the green layer and the grain of the green layer, the same as if the layer had been green-blue sensitive. However now the grain of the blue layer is also added, so the overall graininess is worsened, and the quantum detectability reduced.

Figure 3:
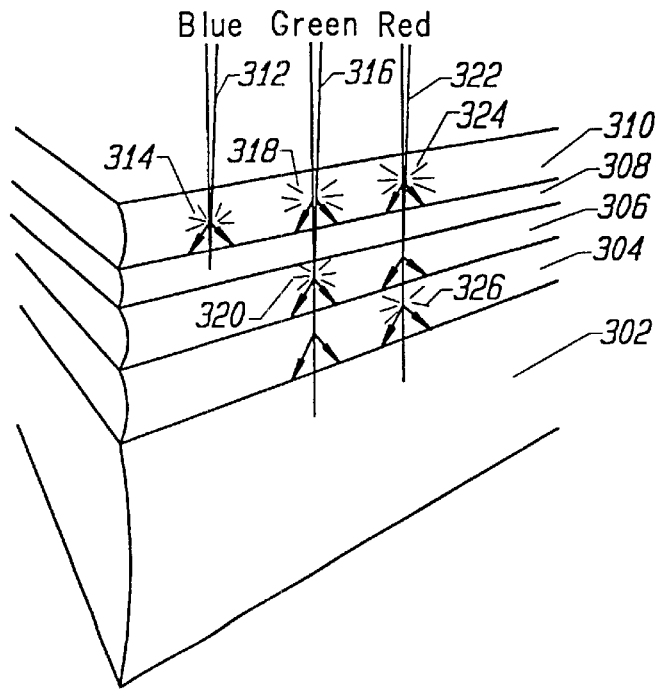
FIG. 3 illustrates the construction of luminance priority color film.

Turning now to FIG. 3, the construction of the preferred embodiment of luminance priority color film is described. As in the prior art of FIG. 1, construction begins with a structural base 302, a red sensitive layer 304, a green sensitive layer 306, and a yellow filter layer 308. The top layer 310 distinguishes luminance priority film over the prior art. This top layer 310, which is in a plane perpendicular to the other sensing layers, is a sensitizing dye extending sensitivity to the green and red portions of the spectrum so as to generally match the luminance sensitivity of the human eye. In addition, the top layer 310 is thicker than the top blue sensitive layer 210 of prior art film to give priority sensitivity to this layer. Again, the manufacture of film is commonly known in the art, and in addition sensitizing dyes needed to add green and red sensitivity are commonly known and used in most black and white films to impart panchromatic sensitivity. Details of sensitizing emulsions with dyes are commonly known in the art.

A red blue light ray 312 penetrates the top layer to generate a silver latent image at point 314. A green light ray 316 penetrates the film to generate two latent image centers at points 318 and 320. Also a red light ray 322 penetrates the film to generate two latent image centers at points 324 and 326.

Figure 4:
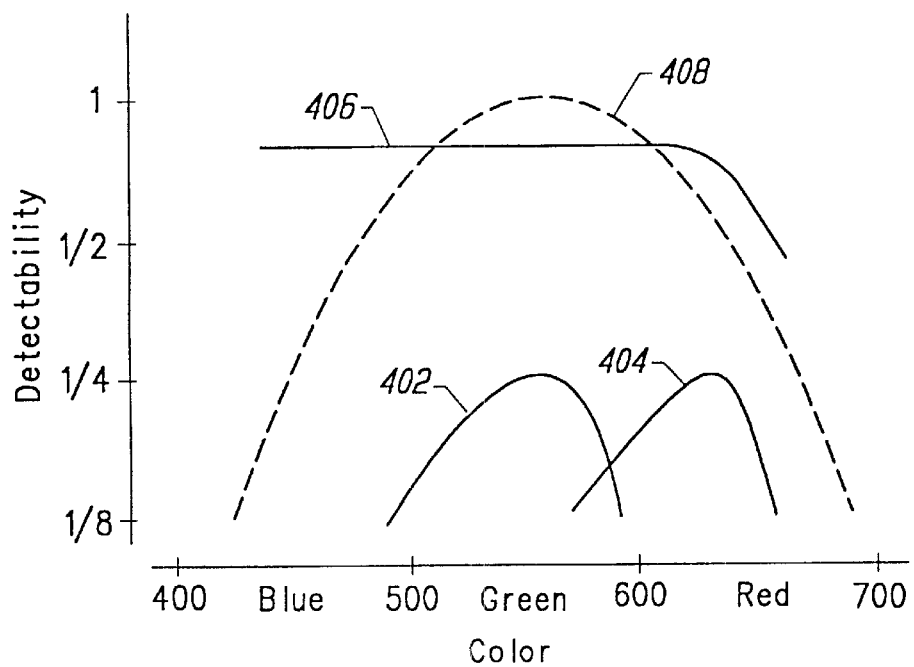
FIG. 4 graphs the quantum detectabilities of luminance priority color film.

FIG. 4 illustrates the spectral quantum detectability response of the sensitive layers 304, 306, and 310 of the luminance priority film of FIG. 3 for comparison with the responses of prior art film as given in FIG. 2. The axes are wavelength versus quantum detectability with the same units and magnitudes as used for FIG. 2 for comparison. In FIG. 4, curve 402 illustrates the quantum detectability of the green layer 306 and curve 404 illustrates the quantum detectability of the red layer 304. Note that both of these are lower than the equivalent curves 206 and 212 from FIG. 2 because the top layer is given a priority thickness. The green curve 402 may suffer the most because the green is no longer the prime bearer of luminance, but only the bearer of the green-magenta color axis to which the eye is least sensitive, and hence the green layer 306 may be thinner than the equivalent layer 106 to allow more light to the red layer 304. The quantum detectability of the top panchromatic layer 310 is illustrated in curve 406 of FIG. 4. This layer is both at the priority position on top and given priority thickness, and therefore curve 406 shows very high quantum detectability.

The overall quantum detectability to luminance is illustrated in curve 408. The height of this curve compared to the luminance detectability of prior art film, shown in curve 216 of FIG. 2, is a major distinguishing benefit of the present invention over the prior art. Because most of the detail, and hence the impression of grain and sharpness, comes from luminance, a high luminance quantum detectability translates to an overall impression of higher quantum detectability. This could translate either to better clarity at an equivalent film speed, or a higher film speed at equivalent clarity when comparing luminance priority film to prior art film.

The curve 408 is seen to slightly exceed curve 406 in the important yellow portion of the spectrum for an interesting reason. In the case of FIG. 2 described above, each color was sensed separately, and hence the detectability of the sum for any single color was less than the detectability of the layer specific to that color alone. In the case of FIG. 4 however, a specific color, such as green, is actually sensed by two layers, namely the luminance 310 and green sensitive 306 layers. After the gain of each layer is adjusted so the sum of the layers matches the luminance of the human eye, the signal is the sum of each gain modified layer, and the noise is the square root of the sum of the squares of the noise of each gain modified layer.

The above will be explained using an example. For simplicity assume there was only the green and luminance layers, both had equal sensitivity to green, and both were modified by unity gain. Now the green signal would be doubled by adding the channels of the two layers together, but the random noise would add statistically for only square root of two more grain noise, so the signal to noise ratio would improve by the square root of two, and the quantum detectability would double with this increase, as explained before. Again, this is logical because under the above simplifying assumptions, the two layers would be sensing the green light equally, and this would be equivalent to the case of a double thick layer described earlier. This is distinguished from the case of a separate blue and green layer added together as described earlier, because in that case, to green light, only one layer was responding, and the second blue sensitive layer was adding no signal, only noise. In practice with two layers, the optimum compromise for the best signal to noise ratio would give a second layer a gain ratio, compared to the gain of a first layer, that equals the square of the ratio of the signal to noise ratios of the second to first layers divided by the signal ratios of the second to the first layers. Further detail may be found in references on statistical communication theory such as Parker, Sybil, Communication Source Book, McGraw Hill, N.Y., 1987. (TK5101.C6588 1998).

The practical effect of the above discussion is now presented. In the case of luminance priority film, there are three layers added together, and the bottom two have lower quantum detection than the top luminance layer. Qualitatively, in the preferred embodiment of a red and green layer under a luminance layer, the luminance layer should be slightly deficient in red and green, as would normally occur naturally as a result of the excess blue sensitivity of silver halide, and this deficiency made up by adding a small amount of red and green to the luminance channel derived from the scanned film channels during color space conversion.

Continuing with the preferred embodiment, ideally the film would be manufactured for digital development. Such manufacture would not place color couplers in the emulsion, further enhancing the sharpness of the film compared to conventional film by reducing light scattering from the couplers. In digital development the film is scanned with infrared during development. Because the silver image is scanned, colored dyes need never form and color couplers are not needed, even for negative film. Scanning is performed with reflected light from the front, separately with reflected light from the back, and separately with transmitted light through the film. Because of the opalescent nature of silver halide in the developer before fixing, the front scan sees primarily the top layer, the back scan sees primarily the bottom layer, and the through scan sees all layers in proportion to their thickness. Details on digital development may be seen in U.S. Pat. No. 5,465,155, Duplex Film Scanning, by Edgar.

Alternately, the film could be prepared for conventional processing by including color couplers. These couplers could follow the same order as conventional film with the red sensitive layer specific to cyan, the green sensitive layer specific to magenta, and the luminance sensitive layer specific to yellow. If printed conventionally, such a film would produce very muted but recognizable colors. For quality results, such a film would require scanning followed by color space conversion, as will be described below. Blue is a difficult color to scan electronically because many light sources like incandescent and light emitting diodes are deficient in blue, negative films have an orange cast that filters blue, blue filters tend to be less efficient than other colors, and sensors based on silicon are relatively deficient in blue compared to a flat spectrum. Because of difficulties with blue sensitivity, many electronic scanners produce excess noise in the blue channel. In the prior art, blue contributed so little to luminance that there was little motivation to fix the problem in lower cost scanners. However in luminance priority film the luminance channel is critical, and for reasons specific to some lower cost scanners, allocating the critical luminance layer to the blue modulating yellow dye is a bad tactical choice.

For the above reason, the preferred embodiment places magenta specific coupler in the luminance layer, cyan specific coupler in the green sensitive layer, and yellow specific coupler in the red sensitive layer. Besides improving the film for electronic scanning, this complete color mismatch would avoid mistaken printing as conventional film.

The spirit of the present invention is to include in a color film a layer that substantially and generally matches the luminance response of the human eye. This match does not have to be exact, and in fact a small deviation has been shown to be beneficial; therefore the word substantial should not be construed to mean that the match must be exact. The intent and purpose of providing a substantial match to luminance clearly distinguishes from the prior art in which the intent and purpose was for each layer to directly represent one of the specific colors red, green, and blue.

Other luminance priority topologies different from the preferred embodiment will provide the major advantages of the present invention, even though they may be slightly less advantageous than the preferred embodiment. Several of these alternatives are now presented. This list should not be considered to be exhaustive or to express limitations. It is of course possible to exchange the positions of the red and green sensitive layers with nearly equal results. The pair of red and green sensitivities can be substituted for yellow, which is the sensitivity of panchromatic under a yellow filter, and green, or yellow and red. These combinations further enhance luminance detectability at the expense of chrominance detectability. Further, the yellow filter may be moved further down or eliminated. For reasons discussed earlier, this would usually reduce detectability compared to the preferred embodiment, however the advantages of the invention would still make such a film superior to conventional prior art films.

Further, the luminance layer could approximate luminance with green and one other color. This could be green and blue, for what is classically called orthochromatic sensitivity. The word orthochromatic means true color. A particularly interesting combination would place a thin blue layer on top, followed by a yellow filter, followed by a panchromatic layer responsive to yellow light as the luminance layer, followed by an orthochromatic layer responsive to green light. Note also that because of the color space conversion, there is no requirement for the different layers to match in contrast, as with prior art film designed for direct printing.

Color space conversion is now described. As mentioned above, luminance priority color film can not be directly printed on conventional printing paper with color fidelity. The color channels from luminance priority color film must be operated on by a color space conversion to remap the colors in the film to the true colors. It is theoretically possible to do this mapping with color separations and color masking in an all chemical process, however such a procedure is not deemed competitive in a modern digital world, and so the preferred embodiment will disclose an electronic method.

Figure 5:
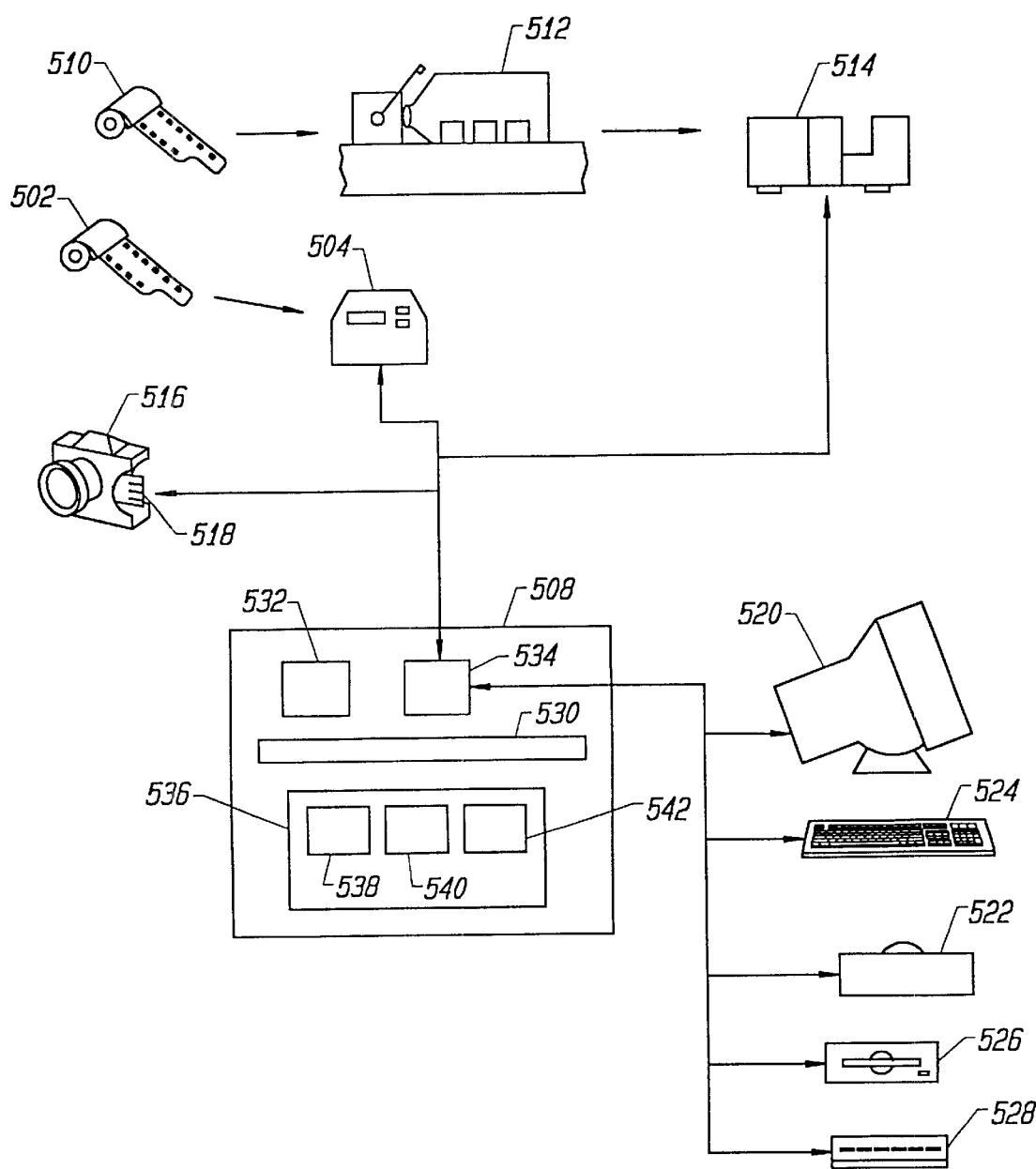
FIG. 5 shows a system for practicing color space conversion.

FIG. 5 portrays two routs to electronically scanning a luminance priority image on film into a digital data file. In the preferred embodiment, an exposed luminance priority film 502 manufactured for digital development is input into a digital development machine 504. Details of this machine may be found in U.S. Pat. No. 5,465,155, by Edgar. This machine outputs a digital data file on line 506 connected to a computer 508, such as manufactured by Apple Computer Corporation of Cupertino, Calif. Alternately, an exposed luminance priority color film 510 manufactured for conventional development is input to a conventional film processor 512, such as manufactured by JOBO Corporation of Gummersbach, Germany. After processing, the film is input to a conventional film scanner 514 such as manufactured by Nikon Corporation of Tokyo, Japan. The scanner outputs a digital data file on line 506 connected to the computer 508 for further processing.

Further, an electronic imaging camera 516 using a luminance priority sensor, as will be described in more detail below, can be used to capture directly the luminance and chrominance channels and output these channels as a digital data file via internal conventional control and conversion logic 518 on line 506 connected to the computer 508 for further processing.

The computer 508 has attached to it a monitor 520 for display, a printer 522 for printing, a keyboard 524 for data entry and control, an optical disk 526 for data storage, and a modem 528 for communications. Internal to the computer 508 is a bus 530 for moving data between modules. Attached to the bus 530 are a processing module 532, input output module 534 to transfer data to the various peripheral devices attached to the computer, and a memory module 536. The memory module has stored internally an input image 538, an output image 540, and a control program 542 to direct movement of the images between the peripheral devices and to direct the processing module 532 to derive the output image 540 from the input image 538. After deriving the output image 540, the control program 542 may direct the processing module 532 to move the output image 540 over the bus 530 to the peripheral devices such as the monitor 520 for viewing, the printer 522 for printing, the optical disk storage 526 for storage, or the modem 528 for transmission. Further details on the operation of a computer system for image handling may be found in references such as L. Uhr, K. Preston Jr., S. Leviabli, MJB Duff, Evaluation of Multi-computers for Image Processing, Academic Press Inc. 1986.

In performing color space conversion, normally there is an input image consisting of three channels. This means each pixel of the input image has three measurements, one from each channel, associated with that pixel. The conversion produces an output image consisting of three channels, meaning each pixel of the output image has three values, one for each channel, associated with that pixel. To perform a color space conversion, the algorithm must scan through each pixel of the image. This scan may be done by "nesting" two "loops", which are common terms in computer programming. At each individual pixel, the three input measurements are taken from the three channels of the input image. These three input measurements are processed by the color space conversion algorithm to produce three output values. These three output values are then placed in the corresponding pixel of the output image by placing them in the three channels of the output image.

The input measurements may be the front, back, and through measurements of a digital developer, or the luminance, green, and red measurements of a luminance priority film in a conventional scanner, or the luminance, yellow, and green measurements of a luminance priority sensor. There may be four measurements, as in U.S. Pat. No. 5,266,805 System and Method for Image Recovery by Edgar, that measures red, green, blue, and infrared. The output values may be the red, green, and blue values of a computer monitor, the XYZ coordinates of visual color space, the YUV or YIQ measurements of digital video, or even the four values cyan, magenta, yellow, and black sent to a printer.

There are many methods of color space conversion to process the input measurements to the output values. For example, one could convert using classic linear matrix equations, such as is done in NTSC television. The problem is that in most cases linearity is only an approximation. Sometimes the approximation can be improved by adding one dimensional nonlinearities to individual color channels, such as in U.S. Pat. No. 5,265,200 System and Method for Automatic Image Saturation, Gamma, and Exposure Correction in a Digitizing Video Capture System, and U.S. Pat. No. 5,469,275 Method and Apparatus for Grayscale Adjustment, both by Edgar. In a luminance priority film manufactured anticipating color space conversion, there is no requirement that the different sensitive layers have equal contrast or even equal curve shape or equal spectral sensitivity versus exposure. Releasing the film of such requirements puts additional requirements on the conversion algorithm. In the case of digital developer where there is an interaction of different sublayers of different speeds for each color, the nonlinearities are very complex. A lookup table can handle very complex color space conversion in a simple algorithm. Suppose that the algorithm receives the three input measurements mentioned earlier. Suppose further that each of these measurements is an 8-bit value. In its simplest form, a lookup algorithm would concatenate these three 8-bit strings together to make a 24-bit string. That 24-bit string is then used as an address into a lookup table that has an element for each possible combination of the three 8-bit input measurements. Each element of the lookup table contains the three 8-bit output values desired for that combination of input measurements. Once an element is addressed, the three output values may be read and copied into the output image.

Such a table would be 12 megabytes long. This is not unreasonable in modem computers, and so this simple algorithm is given as the preferred embodiment. There are many ways to reduce memory requirement drastically at the expense of processing time. As an example, only the most significant 6-bits of each input measurement may be used in the concatenation to cut the size of the lookup table to just 256 kilobytes. The truncated bits can be used to interpolate between elements of this much smaller lookup table, and recover most of the accuracy.

The values in a lookup table must be pregenerated. Continuing with the preferred embodiment of a large lookup table, the values of certain points will be found empirically, and the rest will be found by interpolating these empirically derived points. To practice this method, a large number of colors are measured with test equipment to derive known color values in the desired output color space for each of the colors. Each of these colors is then exposed to a luminance priority sensor. The three measurements are then read from the sensor. The measurements from the sensor are used as explained above to access an element of the lookup table, and the known color value for that color is copied into that element. Whenever the sensor yields those exact three measurements again, a lookup will retrieve the color known to have generated those measurements. After finishing with the large number of experimental colors, there will still be blank elements in the large lookup table between the known elements. These are filled in by interpolating between close elements in the table of known value.

Figure 6:
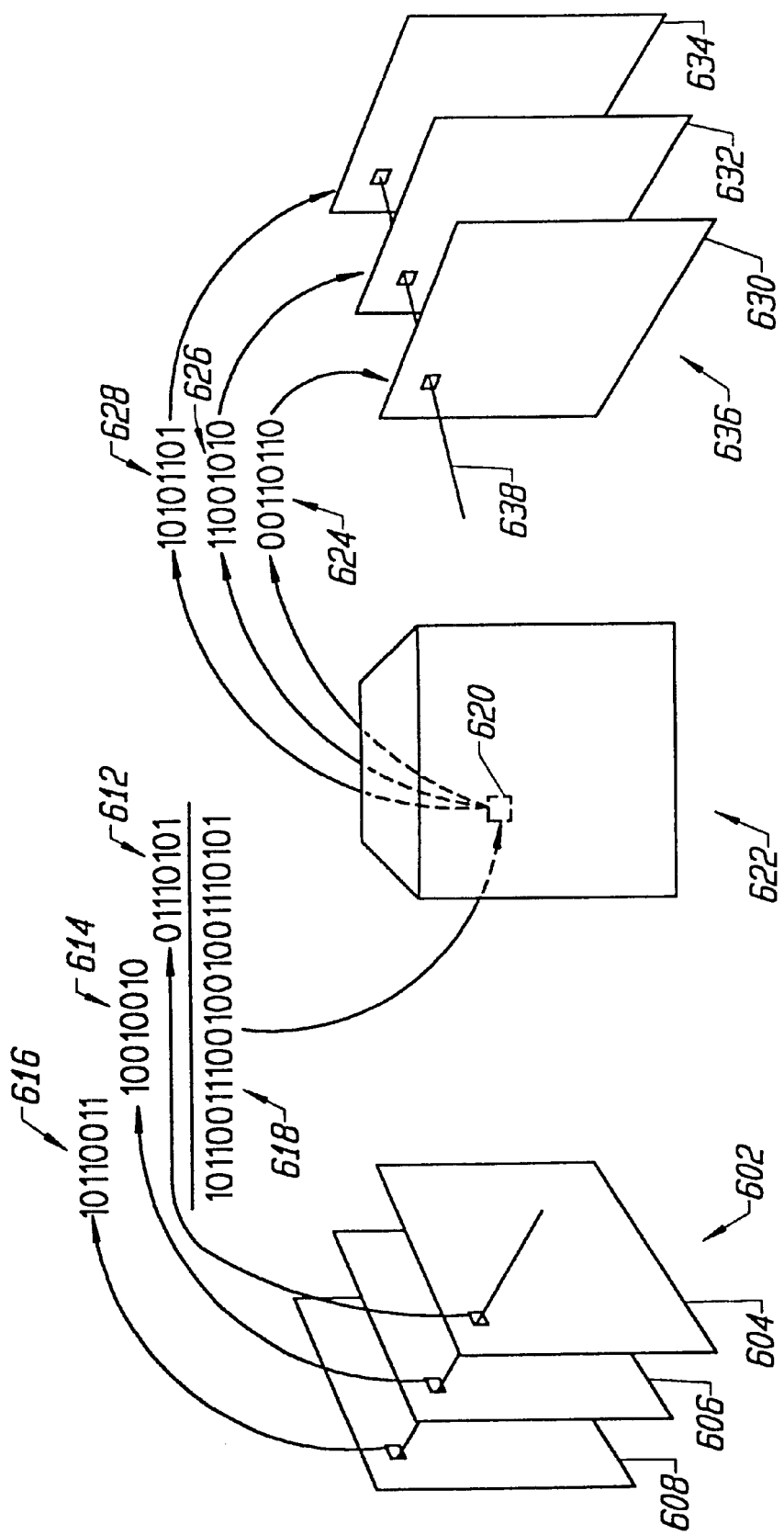
FIG. 6 portrays color space mapping algorithms.

FIG. 6 illustrates the preferred embodiment of a color space conversion algorithm using a lookup table. Such an algorithm would reside in the control program 542 in memory module 536 of FIG. 5, and would direct the processing unit 532 to process an input image 538 to produce an output image 540. Returning now to FIG. 6, an input image 602 derived from a luminance priority sensor contains three color channels 604, 606, and 608. These may be the front, back, and through scans from a digital developer processing luminance priority film. A pixel 610 is chosen from the input image, and that pixel's corresponding measurements 612, 614, and 616 from each of the three color channels are read from the image. These three measurements are concatenated into one address 618. This address points to an element 620 in a lookup table 622. From this element are read three values 624, 626, and 628 that give the converted color. These three values may be the red, green, and blue components to drive a computer monitor.

These three values are copied into the three color channels 630, 632, and 634 contained by an output image 636 at an output pixel 638 corresponding to the input pixel 610. The above process is repeated for each individual pixel in the input image 602 to fill each pixel in the output image 636. When done, the output image 636, the same as output image 540 of FIG. 5, may drive a computer monitor 520 with a beautifully colored image. The invention of a luminance priority sensor is not limited to silver halide film. Luminance priority may be applied to nonsilver films. Further, it is not limited to chemical based phototechnology. A particularly useful application is in the direct capture of electronic images. Electronic image sensors include Vidicon tubes of yesteryear, arrays cadmium sulfide semiconductors, and other technologies. Today the only practical electronic image sensors use silicon in a CCD array, and so the preferred embodiment will be given using that available technology, not as a limit, but as an example.

Figure 7:
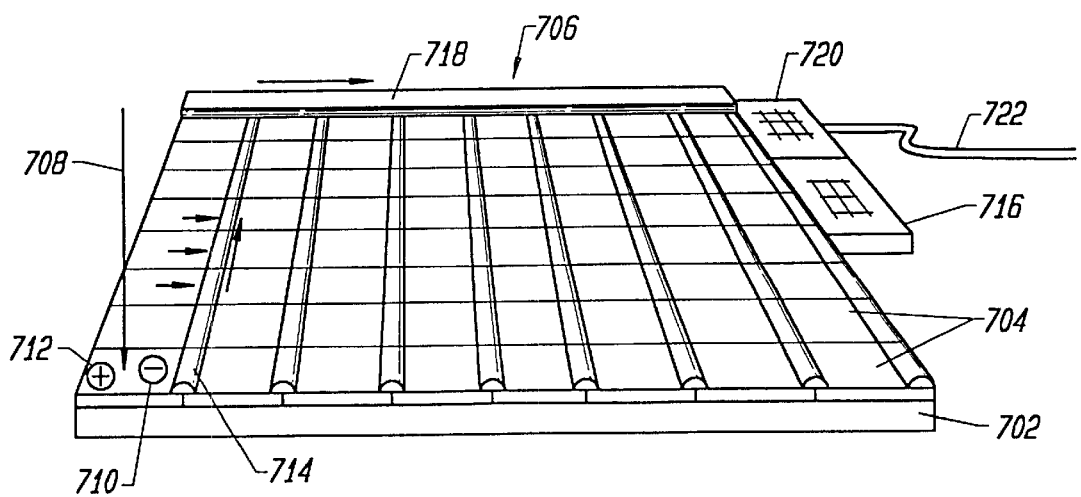
FIG. 7 illustrates the structure of a typical prior art CCD sensor.

FIG. 7 illustrates essential elements of a conventional silicon based Charge Coupled Device, or CCD, sensor. On a substrate 702 individual PN diode junctions 704, in a two dimensional matrix forming an area array 706, are reverse biased. Normally no current flows in the reverse biased diode, however a photon 708 may knock an electron 710 from an atom of the semiconductor, leaving behind a hole 712. This hole-electron pair allows a quantum of current to flow in the diode junction, sensing the interception of the electron. This small amount of charge is collected in a charge shift register 714. On command from control logic 716, this shift register serially shifts the charge from each diode to another shift register 718 which shifts the charges serially to an amplifier 720 and off the sensor for further processing along line 722. Such a topology is called an "area array", and is used to capture an image.

Alternately a single row of diodes may output to a single shift register, or alternate diodes may output to alternate shift register on either side. Such a topology is called a "linear" or "line" array, and is used in conjunction with a mechanical scanning movement in a direction perpendicular to the line of diodes to capture a complete two dimensional image. Other topologies include several parallel lines of pixels which shift into each other as an image moves, called a Time Delay Integration, or TDI array. More details on the construction of electronic image sensors may be found in references such as M. J. Howes, D. V. Morgan, Charge-Coupled Devices and Systems, John Wiley & Sons, New York, 1980, and Roger Melen, Dennis Buss, Charge-Coupled Devices: Technology and Applications, IEEE Press, 1977.

CCD cameras sense color in one of three ways. The first way makes three separate monochrome scans of an image, changing the light color or changing a colored filter over the imaging lens so one scan sees in red light, one in green light, and a final in blue light. This method was used for early color television, was used for color in early space flights, and is still used in many film scanners. Because the colors are sensed at different times, quality is severely degraded with moving subjects. A second way splits light with dichroic prisms into three colored beams, and places three area sensors, one in each beam. The sensors are placed in different planes because of different optical path lengths, and are offset laterally from each other, however the "virtual images" of the three sensors, as seen I through the dichroic prisms, overlap each other in register. It is common in the art to align the red and blue sensitive sensors precisely on each pixel, called "co-site alignment" in the art, but to align the green sensor in a register offset by half the distance between adjacent sensing elements in a direction in the same plane as the red and blue sensors. The effect of this is that moire seen by the red and blue sensors are repeated in the green sensor 180 degrees out of phase. Because luminance is comprised of approximately half green, moire effects tend to cancel in the luminance channel. Such so called "three chip" cameras produce beautiful images, and are almost universally used for professional studio work. They are expensive, they are bulky because of the prisms, they require special and expensive lenses to project a virtual aperture through the tunnel of the prism optical path, and in practice they are much less sensitive to dim light than so called "single chip" cameras.

Figure 8:
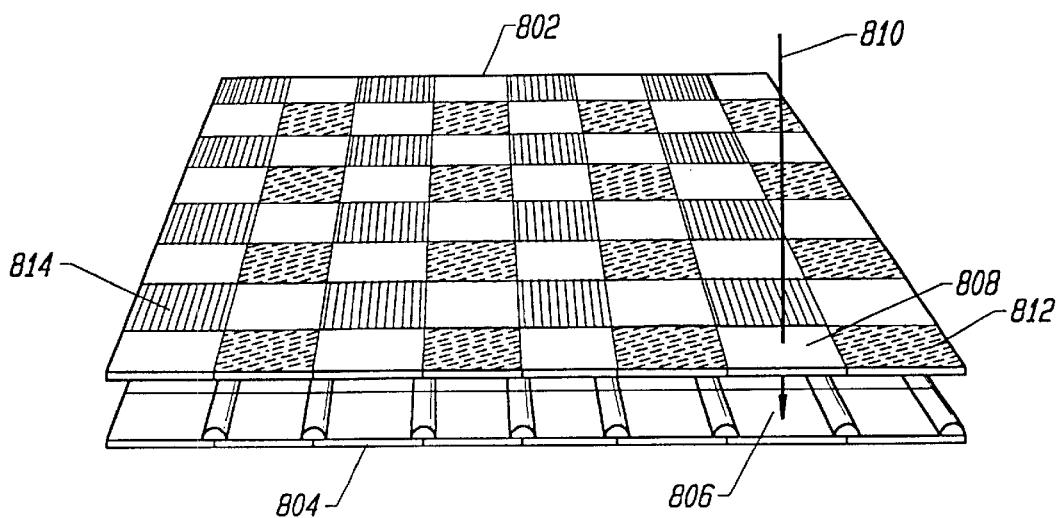
FIG. 8 maps a prior art color matrix for a single chip color CCD sensor.

Referring now to FIG. 8, the most common method of sensing a color image with a CCD sensor is described. In this method a color matrix 802 is laid in register over a CCD sensor 804 as in FIG. 7 so that each diode 806 has laid over it a color filter 808 to filter a light ray 810 bound for that element. There are several arrangements of the filters in common use. The Bayer array shown in FIG. 8 is common in still image capture cameras. In this array, half the filter elements are green such as the filter element 808, represented by white in FIG. 8. A quarter of the filters are blue, represented by black, such as the filter element 812, and a quarter are red, represented by a crosshatch, such as the filter element 814.

An immediate problem arises from the use of such a matrix. It is as though the scene were viewed through a colored screen. A point of light might randomly appear as a bright point of red, or of blue. Thin white lines around windows in a distant building might randomly map to green and blue sensors and appear blueish, or to green and red sensors and appear orangish. This common problem is reduced by blurring the image so a point of light is scattered over at least 4 sensors so all colors are covered. Such a blurring reduces the pixel count resolution by 4, and unless the blurring can have the negative brightness points of a "sinc" function, does not totally eliminate the extraneous colors. These extraneous colors, called color moire, after a French silk, has been a serious problem with prior art electronic image sensing using single chip cameras. "Two chip" cameras are a variation on "three chip" cameras. In this technology, a single non-color specific beam splitter divides all colors of light into two uncolored beams, and places two area sensors, one in each attenuated beam. Because the beams diverge, one sensor cannot be in front of the other, or more precisely, the sensors cannot be offset from each other in a direction perpendicular to the plane of either sensor. One of the sensors has no filter matrix, and is used to sense the luminance component of television video. The other has a color matrix, and is used to sense the color component of television video. Light reaching the color sensor is attenuated both by the non-color specific beam splitter and by the color matrix. To retain reasonable color signal to noise ratios, the color sensor requires light priority, and the luminance sensor can not be given priority as the light is divided. As a result, the sensitivity is as bad, or worse, than a "three chip" camera, and much worse than a single chip camera. In addition, the color matrix on the color chip introduces the color moire artifacts of a "single chip" camera, and the prism adds the bulk and expense of a "three chip" camera. The "two chip" technology is not popular because it combines the disadvantages of two prior art technologies.

Figure 9:
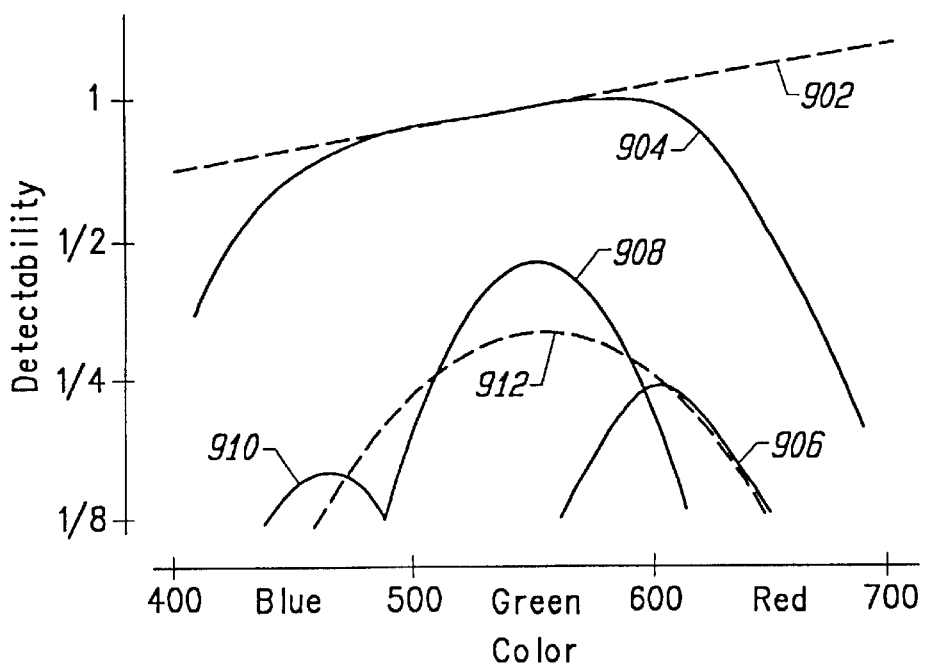
FIG. 9 graphs the quantum detectability of a prior art color CCD sensor.

FIG. 9 graphs the quantum detectability of a CCD array under a color enabling Bayer matrix. The ordinates show quantum detectability versus wavelength, as in FIGS. 2 and 4. Curve 902 represents detectability of an array with no filters. Because a CCD responds with equal current to all absorbed photons, and it absorbs photons with a nearly equal high percentage across the visible spectrum, it tends to be less sensitive to blue light when measured in a standard per unit power because each blue photon has more energy. Because the human eye is also deficient in blue, the eye has a better color match with silicon than with silver halide film. Curve 904 adds the infrared and ultraviolet filters needed for color imagery The infrared filter also removes some of the far red to match the characteristics of the human eye.

Curves 906, 908, and 910 represent color detectabilities under the color matrix filters. The green curve 908 is attenuated to at best half the height of curve 904 because only half the sensors see green light. Sensitivity is reduced further because no green filter passes 100% of green light. Similarly red and blue, shown in curves 906 and 910, attenuate to at best a quarter the height of 904 because only a quarter of the sensors intercept photons from each of those colors and three quarters of the photons of these colors are absorbed by opposition filters. Especially blue is reduced further because available blue filters pass much less than 100% of blue light. These reductions due to a reduced number of sensors are very real, but are typically ignored by just comparing sensitivities. What this is saying is that with fewer sensors exposed to a specific color, the statistical uncertainty noise rises in detecting the exact brightness for that color of any given area. The magnitude of the rise in uncertainty results in a reduction of quantum detectability for that color, even though the sensitivity of an individual sensor for that color remains the same.

Continuing with FIG. 9, curve 912 describes the overall luminance detectability of the sensor which, as described earlier, is slightly lower than each of the composite color detectabilities 906, 908, and 910. A particular camera manufactured by Kodak is available with and without the color enabling matrix. Without the matrix for black and white, the camera is rated to be 4 times more sensitive than with the color matrix. The color rating is ASA 100, which is inadequate for most available light work. Current solutions using night vision photomultipliers, such as used in astronomy and in the military, are very difficult and expensive to extend to color, and limit resolution and other aspects of image quality. This is a serious and limiting problem for electronic image capture and must be solved before electronic cameras can compete with film for wide acceptance.

Figure 10:
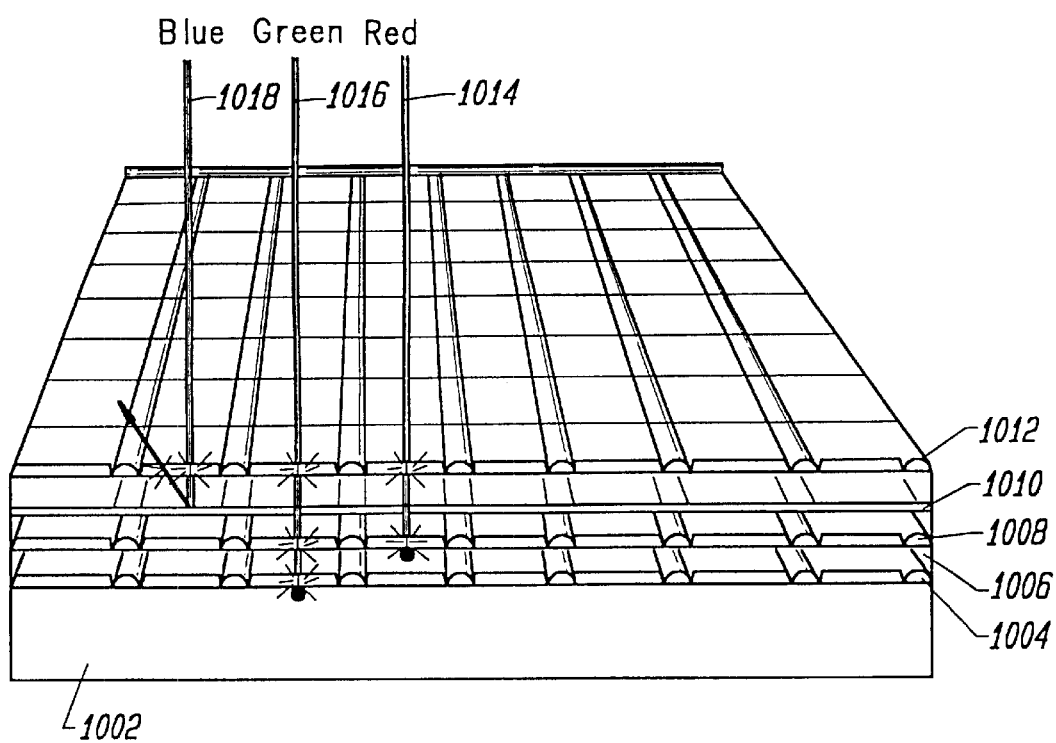
FIG. 10 illustrates the structure of a luminance priority CCD sensor.

FIG. 10 illustrates construction of a preferred embodiment of the present luminance priority invention applied to a color CCD sensor. On a substrate 1002, construction begins with a conventional CCD sensor array 1004, such as portrayed in FIG. 9. Over this sensor a red absorbing, green transmitting filter 1006 is laid. This is also referred to as offset in register. This filter will be underneath a yellow filter, so it makes no practical difference if the filter is green or cyan. Over this filter another CCD sensor array 1008 is a laid. This sensor must be built so the pixel site diodes are not opaque. This can be accomplished in certain topologies by using a transparent electrode for the underside and by making the junction thinner to not intercept all the photons. Over sensor 1008 a yellow transmitting filter 1010 is laid. Over this yellow filter a top sensor array 1012, similar to sensor array 1008, is laid.

The thickness of the top and middle sensitive layers 1012 and 1008 are both chosen to absorb about half the photons reaching the layer, and transmit the remainder. The bottom sensitive layer is built conventionally thick to use all the photons. The result is that about half the photons are absorbed by the top layer, about half of a half, or a quarter, are absorbed by the second layer, and the remaining quarter by the bottom layer. The yellow transmitting filter 1010 may simply absorb blue light. In the preferred embodiment, yellow filter 1010 is a multi layer dichroic filter that reflects the blue light. Such a filter may be made by depositing thin layers of material of alternating indices of refraction, as is known in the art for the manufacture of interference dichroic filters. The difference from common art is that the topmost layer does not have an air interface, and therefore an extra layer is required for the same degree of color discrimination. A description of the construction of such a filter may be found in references such as the Product Reference Guide from Melles Griot, 1770 Kettering Street, Irvine, Calif., 92714.

Continuing with FIG. 10, a red light ray 1014 is seen to penetrate and stimulate arrays 1012 and 1008 before being absorbed by the cyan filter 1006. A green light ray 1016 is seen to penetrate and stimulate all three sensors 1012, 1008, and 1004. This would give green maximum quantum detectability. Finally a blue light ray 1018 is seen to stimulate only the top sensor 1012. In addition the blue light reflects from the dichroic yellow filter 1010 to stimulate the top sensor a second time. Thus, although blue light only stimulates one sensor array, in effect it has the same detectability as if it had stimulated two sensor arrays because blue light stimulates the top array twice. Because the CCD is inherently more sensitive to red than blue, the sum of the two arrays sensing red is in balance relative to the human eye with the one array sensing blue twice. Also the sum of the three arrays sensing green with no attenuation from the infrared or ultraviolet filters, brings green sensitivity into balance with the other colors relative to the sensitivity of the human eye. Because each point in the image has equal access to each of the three color planes, a bright point or a narrow white line would be sensed as the same color independent of its alignment with the matrix. Thus all color moire artifacts are eliminated with the current invention.

Figure 11:
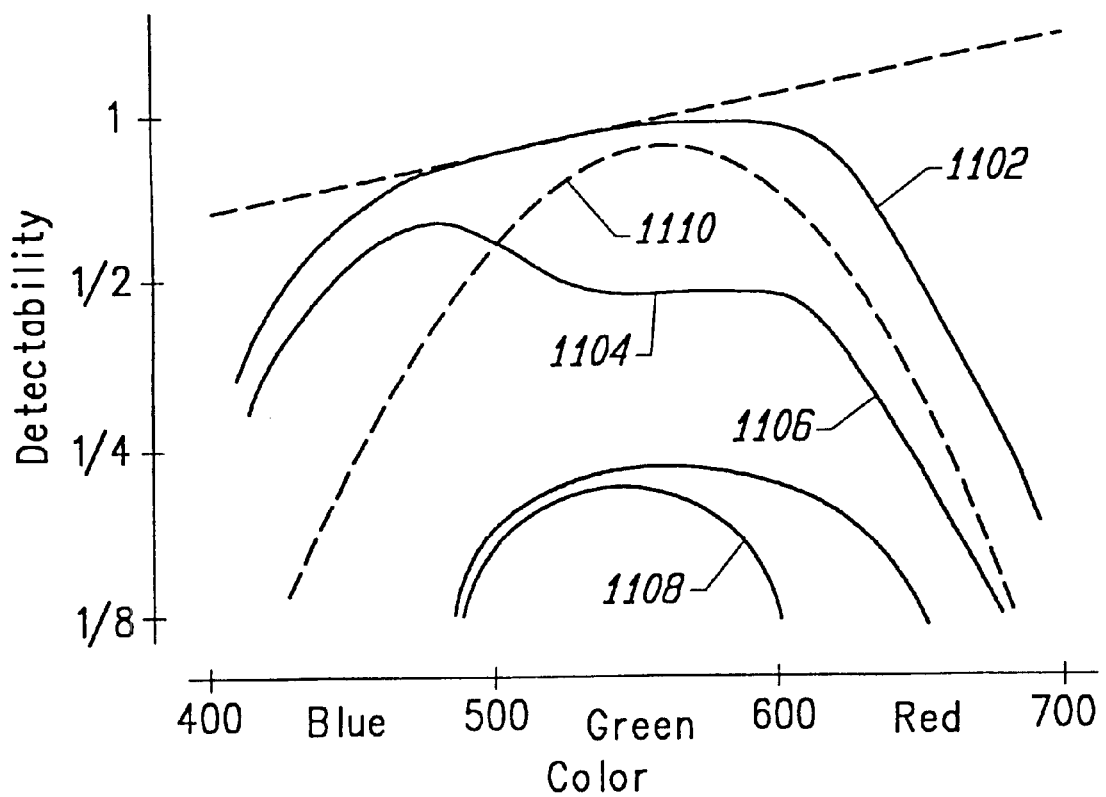
FIG. 11 graphs the quantum detectability of a luminance priority CCD sensor.

FIG. 11 graphs the quantum detectability of the three layers in a luminance priority CCD sensor. Curve 1102 is a copy of curve 904 from FIG. 9 for comparison with the detectability of a monochrome array with no filters except for infrared and ultraviolet. Curve 1104 represents the detectability of the top luminance layer. The natural drop in the blue is countered by the reflection from the dichroic filter layer under the sensor. The overall detectability of the luminance layer is lower than the curve 1102 of a raw CCD imager because the top layer is made thinner so as to allow light through to lower layers, thus it intercepts fewer of the photons and detectability is reduced. Curve 1106 represents the detectability of the middle layer, and curve 1108 the detectability of the bottom layer. All the curves assume the top and middle layers absorb half and transmit half the light, the bottom layer absorbs all the remaining light, and the yellow transmitting filter reflects blue. The overall luminance detectability is shown with curve 1110. Note that in the critical green part of the spectrum, because all three layers are sensing fully and therefore all photons are utilized, the quantum detectability of the layered luminance priority CCD sensor 1110 nearly matches the detectability of the unfiltered monochrome sensor 1102. There is no theoretical loss of detectability in the luminance channel by going to full color over a luminance-corrected monochrome camera. This is a dramatic improvement over the prior art represented by curve 912 of FIG. 9, and makes practical a new world of available light to an emerging mass market of all electronic digital photography. In terms of freedom from color artifacts and image clarity, the present invention of a luminance priority sensor equals the prior art "three chip" technology. In size and eventual cost, luminance priority equals the prior art "single chip" technology. And in quantum detectability, the luminance priority color sensor equals prior art monochrome technology, and therefore exceeds all prior art color technologies.

The spirit of the present invention is to include in an electronic sensor a layer that substantially and generally matches the luminance response of the human eye. This match does not have to be exact, and in fact in the preferred embodiment the luminance layer has an overabundance of red and blue. Therefore the word "substantial" should not be construed to mean that the match must be exact. The intent and purpose of providing a match to luminance by providing sensitivity to all colors clearly distinguishes from the prior art in which the intent and purpose was for each layer to directly represent one of the specific color axes. An interesting analogy is found in black and white film, where panchromatic film provides sensitivity to all colors, as is commonly said, "just like the eye". Even though the match of panchromatic film to the luminance of the eye is very approximate, there is no difficulty distinguishing it from a "colored" rendition through a green or red filter. In this invention, the phrase "substantial match to luminance" is to distinguish over the prior art "color" channel.

Other luminance priority topologies different from the preferred embodiment will provide the major advantages of the present invention, even though they may be slightly less advantageous than the preferred embodiment. Several of these alternatives are now presented. This list should not be considered to be exhaustive or to express limitations. The top yellow filter and bottom cyan filter can be exchanged with results that overall are nearly equal in quality In this alternate embodiment blue is emphasized slightly instead of red. It would also be possible to make the top filter magenta, with the bottom filter either blue or red, but this would deemphasize critical green. In all cases the top filter can be dichroic to emphasize the color being reflected. The lower filter can also be made dichroic. A particularly interesting combination would make the top filter dichroic yellow, and the lower filter dichroic magenta so green is reflected back to the top two sensitive layers for a second chance.

While this invention has been described with an emphasis upon certain preferred embodiments, variations in preferred composition and method may be used and the embodiments may be practiced otherwise than as specifically defined herein. Accordingly, the invention as defined by the following claims includes all modifications encompassed within the spirit and scope thereof.

What is claimed is:

1. A luminance priority color sensor comprising:
   a semiconductor substrate having a plurality of sensing elements disposed on the semiconductor substrate, where each sensing element comprises:
   at least one color sensing layer disposed outwardly from the semiconductor substrate, wherein the color sensing layer is operable to measure an intensity of light within a frequency band corresponding to at least one color of light; and
   a luminance sensing layer disposed outwardly from the at least one color sensing layer, wherein the luminance sensing layer is operable to measure luminance.

2. The luminance priority color sensor of claim 1, wherein the at least one color sensing layer comprises a color sensing layer operable to measure an intensity of light within the red and green frequency bands.

3. The luminance priority color sensor of claim 1, wherein the at least one color sensing layer comprises a color sensing layer operable to measure an intensity of light within the green and blue frequency bands.

4. The luminance priority color sensor of claim 1, wherein the at least one color sensing layer comprises a color sensing layer operable to measure an intensity of light within the red and green frequency bands.

5. The luminance priority color sensor of claim 1, wherein the at least one color sensing layer comprises a color sensing layer operable to measure an intensity of light within the red and blue frequency bands.

6. The luminance priority color sensor of claim 1, wherein the at least one color sensing layer comprises a color sensing layer operable to measure an intensity of light within the group of red, green or blue frequency bands.

7. The luminance priority color sensor of claim 1, wherein the plurality of sensing elements comprises a charge coupled device (CCD) array.

8. The luminance priority color sensor of claim 1, wherein each color sensing layer includes a filter layer.

9. The luminance priority color sensor of claim 8, wherein the filter layer comprises a dichroic filter.

10. The luminance priority color sensor of claim 1, wherein the at least one color sensing layer comprises:
    a red-green color sensing layer operable to measure an intensity of light within the red and green frequency bands; and
    a green color sensing layer operable to measure an intensity of light within the green frequency band.

11. The luminance priority color sensor of claim 1, wherein the at least one color sensing layer comprises:
    a red-green color sensing layer operable to measure an intensity of light within the red and green frequency bands; and
    a red color sensing layer operable to measure an intensity of light within the red frequency band.

12. The luminance priority color sensor of claim 1, wherein the luminance priority color sensor operates within an imaging system.

13. The luminance priority color sensor of claim 12, wherein the imaging system comprises a digital camera.

14. A method of digitizing a scene comprising:
    measuring an intensity of light associated with luminance and outputting luminance data;
    measuring an intensity of light associated with at least one color of light to produce color data;
    wherein the intensity of light associated with the at least one color of light is measured in at least one color sensing layer and the intensity of light associated with luminance is simultaneously measured in a luminance layer superimposed over the at least one color sensing layer; and processing the luminance data and color data to produce values representative of the red, green and blue color components of each pixel within the scene.

15. The method of claim 14, wherein at least one color sensing layer comprises:

a red-green color sensing layer operable to measure the intensity of light associated with red and green light; and a green color sensing layer superimposed under the red-green color sensing layer wherein the green sensing layer is operable to measure the intensity of light associated with green light.

16. The method of claim 15, wherein processing the luminance data and color data to produce values representative of the red, green, and blue components of each pixel within the scene comprises:

calculating the blue component by subtracting the red-green data from the luminance data;

calculating the red component by subtracting the green data from the red-green data; and the green component is directly measured.

17. The method of claim 16, further comprising processing the red, green, and blue components of each pixel to adjust for luminance.

18. The method of claim 14, wherein at least one color sensing layer comprises:

a red-green color sensing layer operable to measure the intensity of light associated with red and green light; and a red color sensing layer superimposed under the red-green color sensing layer wherein the red sensing layer is operable to measure the intensity of light associated with red light.

19. The method of claim 14, wherein each color sensing layer includes a filter.

20. The method of claim 19, wherein the filter comprises a dichroic filter.

* * * * *